Oct. 9, 1928.  
M. J. MALLING  
BUMPER FOR VEHICLES  
Filed Oct. 12, 1927  
1,686,829
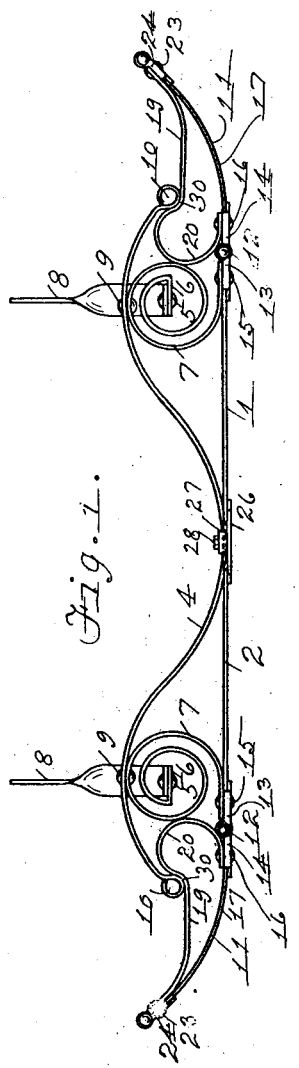
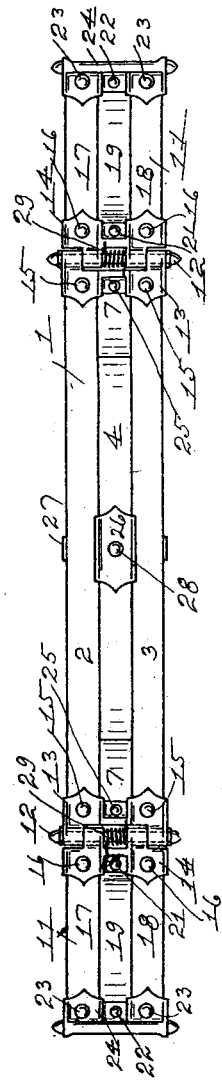
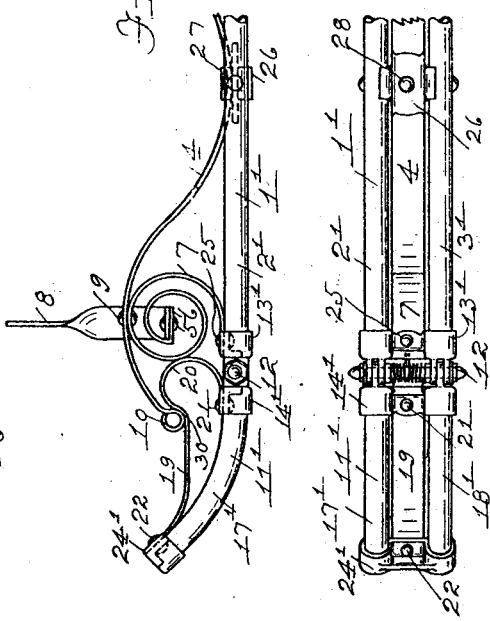
WITNESSES  
William H. Lindae  
Geo. C. Peters
MALTE J. MALLING.  
INVENTOR.
BY  
Cyrus W. Rice  
ATTORNEY.

Patented Oct. 9, 1928.

1,686,829

UNITED STATES PATENT OFFICE.

MALTE J. MALLING, OF GRAND RAPIDS, MICHIGAN.

BUMPER FOR VEHICLES.

Application filed October 12, 1927. Serial No 225,641.

The present invention relates to bumpers for vehicles, as automobiles and the like; and its object is, generally, to provide such a bumper improved in various respects hereinafter appearing; and further, to provide such a bumper which shall be very resilient and nevertheless sufficiently strong; and further, to provide such a bumper having end extensions yieldingly movable rearwardly under impact.

These and any other objects hereinafter appearing are attained by, and the invention finds preferable embodiment in, the structure hereinafter particularly described in the body of this specification and illustrated by the accompanying drawings, in which:—

Figure 1 is a top plan view of a bumper for vehicles;

Figure 2 is a front view thereof;

Figure 3 is a top plan view of the left hand half of such a bumper, showing a modified construction; and Figure 4 is a front view of the same.

In the embodiment of the invention illustrated in said drawings, a bumper is shown having a front horizontal bar designated generally 1 composed of parallel members 2, 3, spaced one above the other, and a horizontal rear bar 4, said bar and both the members 2, 3 being resilient. A pair of curved springs 7, preferably coiled or involuted as shown, are mounted centrally (i. e. at their inner ends 6) on the vehicle, being bolted or riveted at 5 on the forwardly extending supports 8 carried by the vehicle's frame. To diametrically-opposite points of these springs 7 the front bar and the rear bar are connected, respectively, the rear bar being thus connected as by a bolt or rivet 9 and at a considerable distance inwardly from the rear bar's adjacent end 10. Resilient extension members 11 of the front bar are carried at its ends swingably horizontally about vertical pintle axes 12 connecting the members 13, 14 of hinge constructions, one of said hinge members, 13, being carried, as by bolts or rivets 15, on the two members 2, 3 of the front bar, and the other of said hinge members 14, being carried, as by bolts or rivets 16, on the vertically spaced members 17, 18 of the extensions 11. These extensions 11 are preferably resilient bars and each comprises not only said vertically spaced forward members 17, 18, but also a rearward part 19 bent to form bows or loops 20 bearing yieldingly against the adjacent curved or coiled spring 7. One end of said part 19 is connected as by the rivet or bolt 21 to the hinge member 14, the other end of said part 19 and the members 17, 18 at their outer ends being connected as by bolts or rivets 22, 23 to plates 24. A rivet or bolt 25 serves to connect the coiled spring 7 and the hinge member 13. The rear bar 4 and the two vertically spaced members 2, 3 of the front bar 1 are connected at their middles as by the oppositely disposed plates 26, 27 joined by a bolt 28.

Springs 29 coiled about the pintle pins 12 rearwardly press the extension members 11 rearwardly and into contact with the springs 7 and the curved ends 10 of the rear bar 4, such curved ends being yieldingly received in depressions or shallow recesses 30 in the resilient rear part 19 of the extension members 11.

It will be seen that several parts of this bumper structure combine resiliently to resist impacts or thrusts to which the bumper is subjected: A thrust on the face of the front bar 1 is yieldingly resisted thereby and by the rear bar 4 (their middles being connected), and also by the coiled springs 7; a thrust on an extension member 11, turning the same rearwardly about the pintle 12 is yieldingly resisted by the bow or loop pressing on the adjacent coiled spring 7, and also by the curved end 10 of the rear bar 4.

When the vehicle is moved rearwardly, an outer end of an extension member 11 of the front bar in striking an obstruction is swung forwardly against the pressure of the small coiled spring 29.

In Figures 3 and 4 the front bar $1^1$ is composed of vertically spaced members $2^1$, $3^1$ and the extension member $11^1$ is composed of vertically spaced members $17^1$, $18^1$ which are round rigid parts.

The invention being intended to be pointed out in the claims, is not to be limited to or by details of construction of any particular embodiment thereof illustrated by the drawings or hereinbefore described.

I claim:

1. In a bumper for vehicles: front and rear horizontal bars, one of them being resilient; coiled springs, each mounted centrally thereof on the vehicle and connected at opposite points respectively to the front bar and to the rear bar inwardly from the adjacent end thereof; extensions of the front bar horizontally swingable relatively thereto, each of said extensions yieldingly engaging in its rearward movement the adjacent curved spring.

2. In a bumper for vehicles: front and rear horizontal bars, one of them being resilient; coiled springs, each mounted centrally thereof on the vehicle and connected at opposite points respectively to the front bar and to the rear bar inwardly from the adjacent end thereof; extensions of the front bar horizontally swingable relatively thereto, each of said extensions yieldingly engaging in its rearward movement the adjacent end of the rear bar.

3. In a bumper for vehicles: front and rear horizontal bars, one of them being resilient; coiled springs, each mounted centrally thereof on the vehicle and connected at opposite points respectively to the front bar and to the rear bar inwardly from the adjacent end thereof; extensions of the front bar horizontally swingable relatively thereto, each of said extensions yieldingly engaging in its rearward movement the adjacent curved spring and the adjacent end of the rear bar.

4. In a bumper for vehicles: front and rear horizontal bars, one of them being resilient; coiled springs, each mounted centrally thereof on the vehicle and connected at opposite points respectively to the front bar and to the rear bar inwardly from the adjacent end thereof; resilient extensions of the front bar horizontally swingable relatively thereto, each of said extensions yieldingly engaging in its rearward movement the adjacent curved spring.

5. In a bumper for vehicles: front and rear horizontal bars, one of them being resilient; coiled springs, each mounted centrally thereof on the vehicle and connected at opposite points respectively to the front bar and to the rear bar inwardly from the adjacent end thereof; extensions of the front bar horizontally swingable relatively thereto, each having a depression in which yieldingly engages the adjacent end of the rear bar.

6. In a bumper for vehicles: front and rear resilient horizontal bars connected at their middles; coiled springs, each mounted centrally thereof on the vehicle and connected at diametrically opposite points respectively to said bars inwardly from the adjacent ends thereof; resilient extension members of the front bar mounted thereon swingably about vertical axes, each of said members yieldingly engaging in its rearward movement the adjacent coiled spring and each of said members having a depression in which yieldingly engages the adjacent end of the rear bar.

7. In a bumper for vehicles: front and rear resilient horizontal bars connected at their middles; coiled springs, each mounted centrally thereof on the vehicle and connected at diametrically opposite points respectively to said bars inwardly from the adjacent ends thereof; resilient extension members of the front bar mounted thereon swingably about vertical axes, each of said members yieldingly engaging in its rearward movement the adjacent coiled spring and each of said members having a depression in which yieldingly engages the adjacent end of the rear bar; coiled springs pressing said extension members rearwardly.

8. In a bumper for vehicles: front and rear horizontal bars; extensions of the front bar horizontally swingable relatively thereto, each of said extensions comprising vertically spaced resilient forward members and a resilient rear part yieldingly engaging in its rearward movement the adjacent end of the rear bar, said rear part being spaced from said forward members and its ends and the ends of said members being connected.

In testimony whereof I have hereunto set my hand at Grand Rapids, Michigan, this 5th day of October, 1927.

MALTE J. MALLING.